United States Patent [19]
Spencer

[11] 3,764,998

[45] Oct. 9, 1973

[54] METHODS AND APPARATUS FOR REMOVING PARITY BITS FROM BINARY WORDS

[75] Inventor: William H. Spencer, Monrovia, Calif.

[73] Assignee: Bell & Howell Company, Chicago, Ill.

[22] Filed: Aug. 4, 1972

[21] Appl. No.: 278,137

[52] U.S. Cl. .......................... 340/172.5, 179/15 BV

[51] Int. Cl. .......................... G06f 3/00, G06f 5/06

[58] Field of Search .................. 340/172.5, 146.1; 179/15 AL, 15 BV; 178/50; 325/41

[56] References Cited

UNITED STATES PATENTS

| | | | |
|---|---|---|---|
| 3,310,626 | 3/1967 | Cassidy | 178/50 |
| 3,310,780 | 3/1967 | Gilley et al. | 340/172.5 |
| 3,348,203 | 10/1967 | Allen | 340/167 |
| 3,387,086 | 6/1968 | Beresin | 178/50 |
| 3,413,611 | 11/1968 | Fuetze | 340/172.5 |
| 3,548,309 | 12/1970 | Saltzberg et al. | 325/38 |
| 3,576,396 | 4/1971 | Sloate | 178/69.5 F |
| 3,612,660 | 10/1971 | Miller | 340/172.5 |
| 3,652,803 | 3/1972 | Joel, Jr. | 179/18 J |
| 3,696,338 | 10/1972 | Preiss | 340/172.5 |

*Primary Examiner*—Paul J. Henon
*Assistant Examiner*—James D. Thomas
*Attorney*—Luc P. Benoit

[57] ABSTRACT

Methods and apparatus for removing parity bits from a first continuous stream of binary words accompanied by a first series of clock pulses to identify the parity bits in the first stream of binary words and remove the identified parity bits. A second continuous stream of binary words is provided in which the binary words of the first stream are expanded into the time period of the removed parity bits. A second series of clock pulses which is provided is adapted to the expanded binary words in the second stream.

There are also disclosed methods and apparatus for identifying parity bits in a continuous stream of binary words having $n$ word bits and $p$ parity bits, the parity bits in different binary words being situated at corresponding locations, and the number of binary "one" word and parity bits being odd in essentially each word. These methods and apparatus determine for $m(n+p)$ bits from the stream of binary words whether the number of binary "one" bits in each set of successive $(n+p)$ bits of said $m(n+p)$ bits is even or odd, wherein $m$ is a positive integer greater than one. These methods and apparatus further identify the parity bits in said $m(n+p)$ bits on the basis of said corresponding locations in response to a determination that the number of binary "one" bits in each set of successive $(n+p)$ bits of said $m(n+p)$ bits is odd.

31 Claims, 8 Drawing Figures

METHODS AND APPARATUS FOR REMOVING PARITY BITS FROM BINARY WORDS

CROSS-REFERENCE

Methods and apparatus herein disclosed are compatible with methods and apparatus disclosed in the copending U.S. Patent Application Ser. No. 278,138 filed of even date herewith by John L. Way, and Ser. No. 321,197, filed on Jan. 5, 1973 by John L. Way, as a Continuation in Part of said serial No. 278,138, and being both assigned to the subject assignee. Subject matter herein disclosed is disclosed and/or claimed in said copending patent applications.

BACKGROUND OF THE INVENTION

1. Field of the Invention

The subject invention relates to the field of pulse code modulation and, more specifically, to methods and apparatus for removing parity bits from streams of binary words and to methods and apparatus for identifying parity bits in stream of binary words.

2. Description of the Prior Art

Known methods and apparatus are not suitable for an identification or removal of parity bits from continuous streams of binary words. Factors which contribute to this problem include the lack of an indication as to the start of each binary word in the continuous stream and the identity of parity bits with data bits as far as pulse shape is concerned.

SUMMARY OF THE INVENTION

It is an object of this invention to overcome the above mentioned disadvantages.

It is an object of this invention to provide methods and apparatus for identifying parity bits in continuous streams of binary words.

It is an object of this invention to provide methods and apparatus for removing parity bits from continuous streams of binary words.

Other objects of this invention will become apparent in the further course of this disclosure.

From one aspect thereof, this invention resides in a method of removing parity bits from a first continuous stream of binary words accompanied by a first series of clock pulses. The invention according to this aspect resides, more specifically, in the improvement comprising in combination the steps of identifying the parity bits in the first stream of binary words, removing the identified parity bits, providing a second continuous stream of binary words in which the binary words of said first stream are expanded into the time periods of the removed parity bits, and providing a second series of clock pulses adapted to said expanded binary words in the second stream.

From another aspect thereof, the subject invention resides in a method of identifying parity bits in a continuous stream of binary words having n word bits and p parity bits, the parity bits in different binary words being situated at corresponding locations, and the number of binary one word and parity bits being odd in essentially each word. The invention according to this aspect resides, more specifically, in the improvement comprising in combination the steps of determining for $m(n+p)$ bits from said stream of binary words whether the number of binary one bits in each set of successive $(n+p)$ bits of said $m(n+p)$ bits is even or odd, wherein $m$ is a positive integer greater than one; and identifying the parity bits in said $m(n+p)$ bits on the basis of said corresponding locations in response to a determination that the number of binary one bits in each set of successive $(n+p)$ bits of said $m(n+p)$ bits is odd.

From another aspect thereof, the subject invention resides in apparatus for removing parity bits from a first continuous stream of binary words accompanied by a first series of clock pulses. The invention according to this aspect resides, more specifically, in the improvement comprising, in combination, first means for identifying parity bits in the first stream of binary words, second means connected to the first means for removing the identified parity bits, third means for providing a second continuous stream of binary words, said third means including fourth means for expanding for said second stream the binary words of said first stream into the time periods of the removed parity bits, and fifth means for providing a second series of clock pulses adapted to said expanded binary words in said second stream.

From another aspect thereof, the subject invention resides in an apparatus for identifying parity bits in a continuous stream of binary words having n word bits and p parity bits, the parity bits in different binary words being situated at corresponding locations, and the number of binary one word and parity bits being odd in essentially each word. The invention according to this aspect resides, more specifically, in the improvement comprising, in combination, means for determining for $m(n+p)$ bits from said stream of binary words whether the number of binary one bits in each set of successive $(n+p)$ bits of said $m(n+p)$ bits is even or odd, wherein m is a positive integer greater than one, and means connected to said determining means for identifying the parity bits in said $m(n+p)$ bits on the basis of said corresponding locations in response to a determination that the number of binary one bits in each set of successive $(n+p)$ bits of said $m(n+p)$ bits is odd.

BRIEF DESCRIPTION OF THE DRAWINGS

The invention and its aspects will become more readily apparent from the following detailed description of preferred embodiments thereof, illustrated by way of example in the accompanying drawings, in which like reference numerals designate like or functionally equivalent parts and, in which.

DESCRIPTION OF PREFERRED EMBODIMENTS

The preferred embodiment shown in FIGS. 1 to 5 has been designed for operation with NRZ codes. This "non-return to zero code" is well known in the art. The chief advantage of this code is that its wave form does not return to zero between digits of the same kind. This results in reduced bandwidth of the system and facilitation of equipment. Those skilled in the art will recognize that these factors are not unique to NRZ codes. Accordingly, the utility of the subject invention is not confined to NRZ codes, but extends to other codes in which an identification or removal of parity bits is necessary or desirable.

Prolonged non-return to zero renders NRZ and similar codes not reliably recordable and reproducible. These and other reasons have prompted the development of a technique in which parity bits are inserted in binary codes of the subject type so as to enhance binary transitions therein.

Particularly advantageous methods and apparatus for this purpose are disclosed in the above mentioned copending Way application. In brief, Way discloses methods and apparatus for enhancing binary transitions in a first stream of binary words accompanied by a first series of clock pulses, each word having n bits and being accompanied by *n* clock pulses. Way, more specifically, discloses the improvement comprising in combination the steps of providing a second series of clock pulses having ($n$+1) clock pulses for each n clock pulses of the first series, providing a second stream of binary words in which each binary words of the first stream is accommodated within *n* clock pulses of the ($n$+1) clock pulses of the second series, and providing binary words in the second stream with parity bits during clock pulses outside the n clock pulses within which each binary word is accommodated in the second stream. A preferred example of the resulting wave form is shown at 10 in FIG. 7. As seen from the wave form 10, the binary words with parity bits are in the form of a continuous stream of binary words. This raises the problem of identifying the words in the absence of indications as to the word beginning or word ending as well as the problem of identifying the parity bits which are either binary zero bits or binary one bits just like the data bits.

In general, each of the words 12, 13, 14 and 15 of the first stream 10 of binary words has *n* word and *p* parity bits. In the illustrated example, there are seven word or data bits and one parity bit for each word. If the number of binary one word or data bits in a word is odd, then the parity bit in that word is a binary zero. On the other hand, if the number of binary one word or data bits in a word is even, then the parity bit in that word is a binary one. In this manner, the number of binary one word and parity bits is odd in essentially each word. This maximizes an enhancement of binary transitions in the code.

Figure 7:
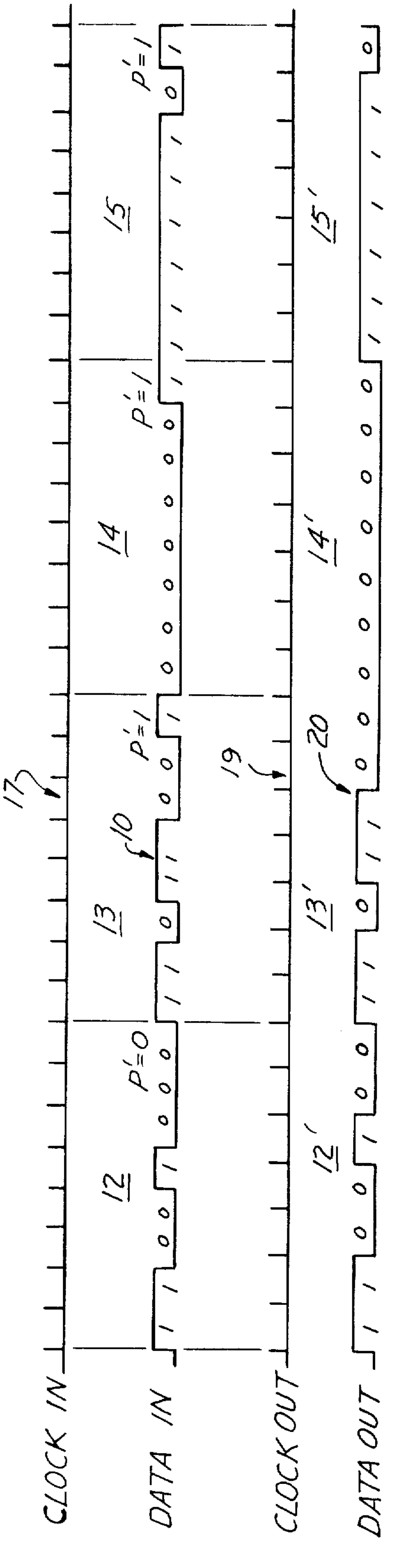
FIG. 7 is a representation of wave forms illustrating the operation of the system of FIGS. 1 to 5.
Figure 8:
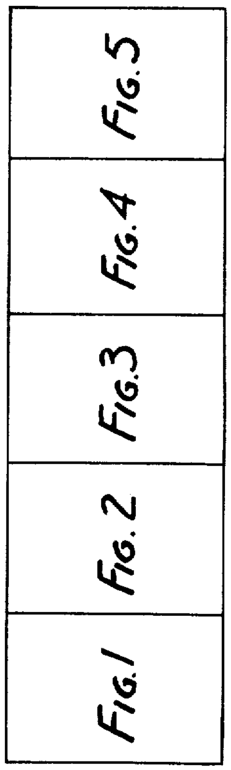
FIG. 8 is a diagram showing how the sheets containing FIGS. 1 to 5 should be positioned for a showing of the illustrated methods and apparatus.

The wave form 17 in FIG. 7 represents a first series of clock pulses. Whenever clock pulses are shown in FIG. 7, only the leading clock pulse edges are illustrated. In reality, the clock pulses typically have significant on-off duty cycles, such as a duty cycle on the order of 50 percent.

As seen in FIG. 7, each word 12, 13, 14 and 15 of the first stream 10 of binary words is accompanied by ($n$+$p$) clock pulses. Since the number of clock pulses for each bit in the illustrated example is one, the first series of clock pulses 17 has eight clock pulses for each binary word with parity bit of the first stream 10 of binary words.

In accordance with the subject invention, a second continuous stream of binary words is provided in which the binary words of the first stream are expanded into the time period of the removed parity bits. Also, a second series of clock pulses is provided which is adapted to the expanded binary words in the second stream. In FIG. 7, the second series of clock pulses is illustrated by a wave form 19, and the second stream of binary words is illustrated by a wave form 20. In the illustrated preferred embodiment, the second series of clock pulses 19 has *n* clock pulses for each ($n$+$p$) clock pulses of the first series 17. By way of example, the second series of clock pulses 19 has seven clock pulses for each eight clock pulses of the first series 17. This may be viewed as an omission of the clock pulse which accompanied the parity bit in the first series.

As may be seen from the wave form 20 in FIG. 7, the second stream of binary words is not only characterized by an omission of the parity bits, but also by an expansion of the binary words or data into the time periods formerly occupied by the removed parity bits. Each word 12′, 13′, 14′ and 15′ of the second stream 20 of binary words thus extends over the time interval that was in the first stream 10 occupied by the corresponding word and the accompanying parity bit. This has the great advantage that the streams of binary words are reconstituted into their original form in which there was no discontinuity between adjacent binary words.

Inventive methods and apparatus for realizing the accomplishments illustrated in FIG. 7 will now be described with the aid of FIGS. 1 through 6.

Figure 1:
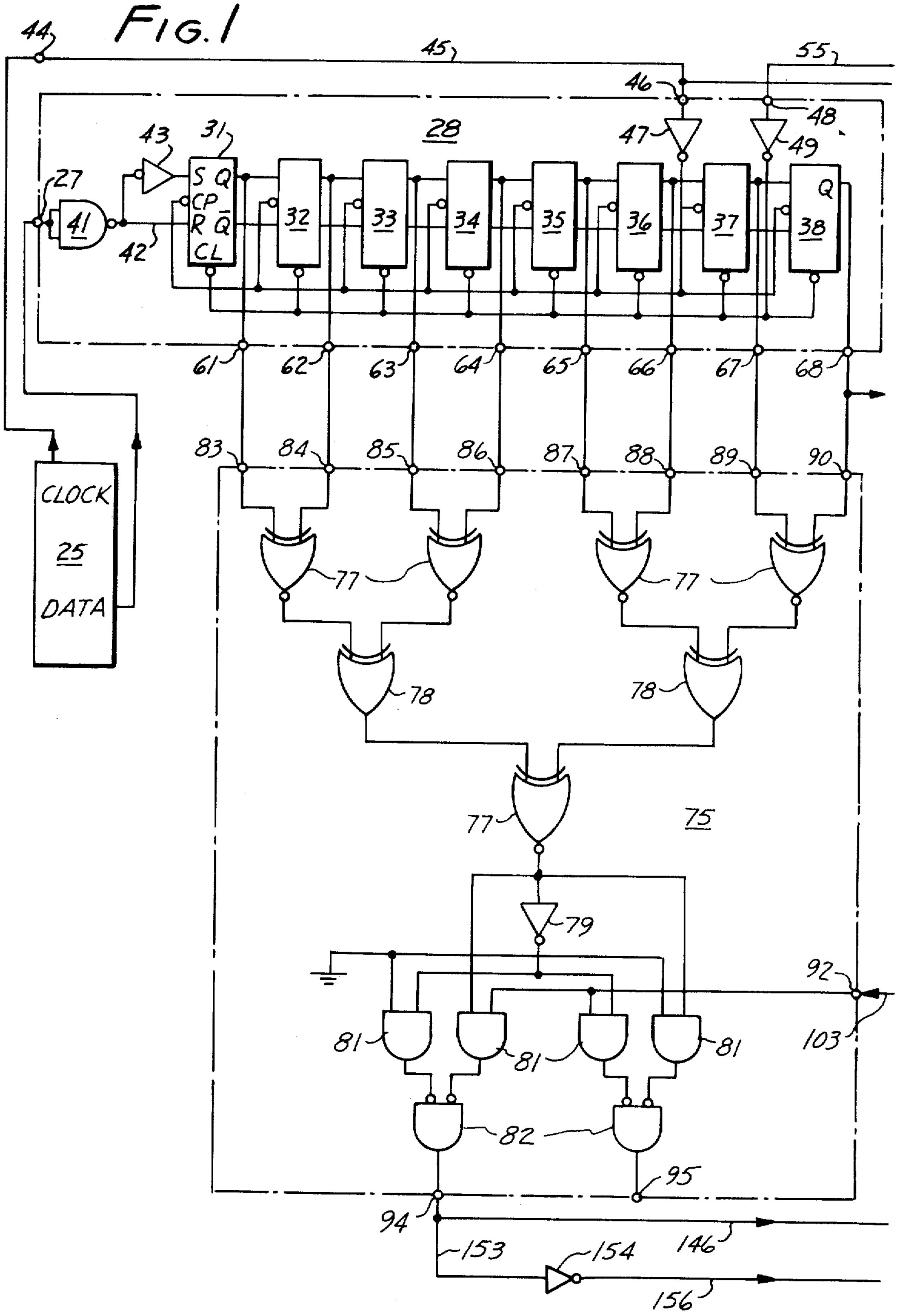
FIGS. 1, 2, 3, 4 and 5 are logic diagrams jointly illustrating methods and apparatus for identifying and for removing parity bits from a continuous stream of binary words, in accordance with a preferred embodiment of the subject invention.

The first stream 10 of binary words with parity bits and the first series of clock pulses 17 are provided by equipment 25 shown in block form in FIG. 1. The equipment 25 may, for instance, include an NTRZ-encoder, a binary transition enhancer of the type disclosed in the above mentioned copending patent application by John L. Way, and means for storing or otherwise processing the enhanced coded information. Where the storing or processing means would distort the clock and data pulses, as is typically the case in magnetic tape recording and playback, equipment including a conventional bit synchronizer may be employed for restoring the data essentially to the form shown at 10 in FIG. 7, as well as for regenerating the clock pulse series 17. The equipment symbolized by the block 25 does not form part of the subject invention.

The first stream 10 of binary words with parity bits is applied through a systems input terminal 27 to a first shift register 28. The shift register 28 may be of a conventional type, such as the shift register type SN74164, made by Texas Instruments Incorporated, of Dallas, Tex., and described and shown, for instance, in Texas Instruments catalog CC-401, Section 9, page 122–125.

The shift register 28 has ($n$+$p$) set-reset stages 31, 32, 33, 34, 35, 36, 37 and 38, wherein n is the number of word or data bits in each word and *p* is the number of parity bits in each word, in the first stream 10 of binary words received through the input 27. In the instant case, there are seven data bits and one parity bit for each word, so that the number of set-reset stages in the shift register 28 is eight.

The register 28 has a NAND element 41 for receiving the data from the source 25 through the systems input 27. The output of the NAND element is connected to the R-input of the first set-reset flip-flop element 31 by way of a lead 42. Conversely, the output of the NAND element 41 is connected by an inverter 43 to the S-input of the first set-reset flip-flop element 31.

To operate the shift register 28 the clock pulses received from the source 25 by way of a systems input 44, lead 45 and shift register input 46, are applied to the clock or CP inputs of the flip-flop elements 31 to 38 through an inverter 47. These clock pulses belong to the first series of clock pulses 17 illustrated in FIG. 7. Actuation of the clear or CL inputs of the flip-flop elements 31 to 38 is not desired in the subject application of the shift register 28 so that the general clear input 48 of the shift register, to which the clear inputs of the elements 31 to 38 are connected by way of an inverter 49, is tied to the binary one output of a NAND element 51, shown in FIG. 3. The output of the NAND element 51 is connected to the input 48 of the shift register 28 by leads 53, 54 and 55.

The equipment under consideration includes two further shift registers 28' and 28'' which are identical to the shift register 28 and have input and output terminals which are identical to the input and output terminals of the shift register 28. Accordingly, the same reference numerals are used in FIG. 2 for the shift registers 28' and 28'' as for the shift register 28 in FIG. 1, except that Prime (') and double-prime ('') marks are employed to distinguish the inputs and outputs of the shift registers 28' and 28'', respectively, from the inputs and outputs of the shift register 28.

Figure 2:
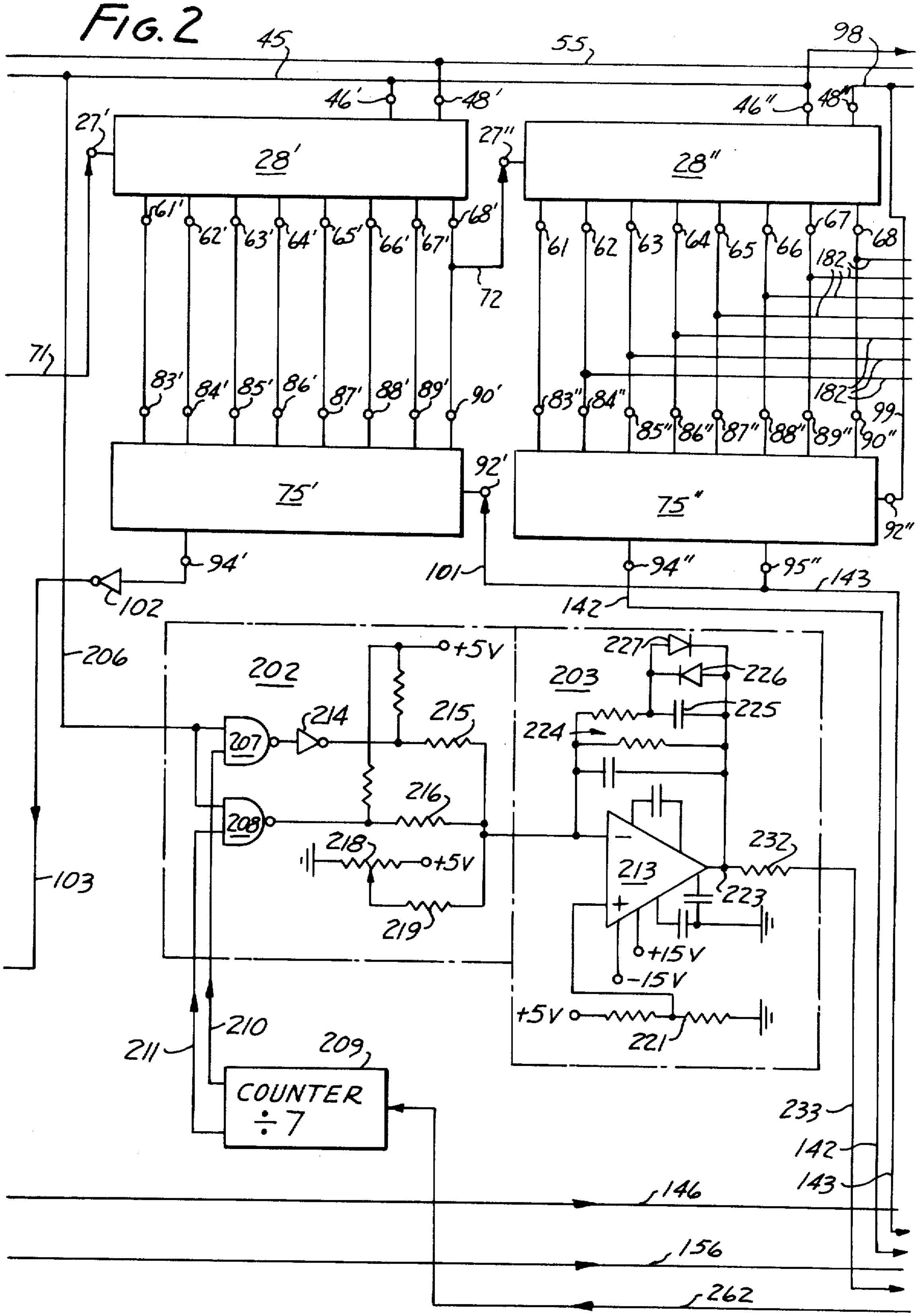

The shift register 28 shown in FIG. 1 has parallel outputs 61, 62, 63, 64, 65, 66, 67 and 68 at which the shifted $(n+p)$ or $(n+1)$ bits of the first data stream 10 appear. The shift registers 28' and 28'' have corresponding parallel outputs as seen in FIG. 2.

The output 68 of the shift register 28 is connected by a lead 71 to the input 27' of the shift register 28'. Similarly, the output 68' of the shift register 28' is connected by a lead 72 to the input 27'' of the shift register 28''.

In order to enable an identification of the parity bits, $m(n+p)$ word and parity bits of the first data stream 10 are shifted into the registers 28, 28' and 28'' by the first series of clock pulses 17, wherein $m$ is a positive integer greater than two, $n$ is the number of word or data bits in a word and $p$ is the number of parity bits in each word of the first data stream 10. If each word has no more than one parity bit, then it may be said that $m(n+1)$ word and parity bits are shifted into the registers 28, 28' and 28''. It will also be observed that $m$ is equal to 3 in the illustrated embodiment, since there are three shift registers 28, 28' and 28''.

It is to be carefully noted at this juncture that it would be incorrect to say that m words or, more specifically, three words are shifted into the registers, 28, 28' and 28''. For this to be possible, it would be necessary that the first data stream 10 contain some identification of the word beginnings or/and endings. As can be seen from the wave form 10 in FIG. 7, no such indications are present in the data stream received from the source 25. Moreover, the shape of the parity bits is identical to the shape of the word or data bits.

Accordingly, the subject invention employs an ingenious system for identifying the parity bits without any reliance on an identification of the word as such or their beginnings and endings.

The parity bit identification system according to the subject invention includes a determination for $(n+p)$ or $(n+1)$ bits from the first stream 10 of binary words whether the number of binarys one bits in the $(n+p)$ or $(n+1)$ bits is even or odd. Referring to the preferred example illustrated by the wave form 10 in FIG. 7, it will be recalled that the parity bit was a binary zero whenever the number of binary one word or data bits in the particular word was odd (see for instance the word 12 in FIG. 7). Conversely, the parity bit is a binary one, whenever the number of binary one word or data bit in the particular word is even (see for instance the words 13, 14 and 15 in FIG. 7).

In consequence, essentially each word in the first data stream 10 has an odd number of binary one word and parity bits. Moreover, in the preferred system under consideration, the word or data bits are located at corresponding first locations, while the parity bits are located at corresponding second locations, in the different words of the first data stream 10.

On the basis of these facts, I have ascertained theoretically and experimentally that an identification of the parity bits is possible with the aid of a continual determination whether the binary one word and parity bits in each set of received $(n+p)$ or $(n+1)$ bits of the first binary stream 10 is odd or even. The accuracy of this identification increases as the number of determination is increased. Accordingly, I prefer a odd/even determination for $m(n+p)$ bits from the first stream 10 of binary words, wherein $m$ is a positive integer greater than one, $n$ is the number of binary word or data bits in each word and $p$ is the number of parity bits in each word. The latter determination is carried out by checking whether the number of binary one bits in each set of successive $(n+p)$ bits of said $m(n+p)$ bits is even or odd. In the illustrated case, the determination proceeds by checking whether the number of binary one bits in each set of successive $(n+1)$ bits of said $m(n+1)$ bits is even or odd.

The odd/even determination is preferably effected simultaneously for at least some sets of successive $(n+p)$ or $(n+1)$ bits of the $m(n+p)$ or $m(n+1)$ bits. Preparatory to a parity bit searching operation, as well as after accomplishment of an operable search routine, the odd/even determination may be effected successively for at least some sets of the defined successive bits.

In the illustrated preferred embodiment, the means for effecting the requisite odd/even determinations include three parity checkers 75, 75' and 75'' which have identical inputs and outputs. These parity checkers which are shown in FIGS. 1 and 2, may be of a conventional type, such as the odd/even parity checker type SN74180 made by Texas Instruments Incorporated, and described and shown, for instance, in Texas Instruments catalog CC-401, Section 9, pages 309–314.

As seen in FIG. 1, the parity checkers 75, 75' and 75'' have a number of Exclusive NOR elements 77, two Exclusive OR elements 78, an inverter 79, a number of AND elements 81 and two NOR elements 82.

The parity checker 75 has eight inputs 83, 84, 85, 86, 87, 88, 89 and 90 which are, respectively, connected to the outputs 61, 62, 63, 64, 65, 66, 67 and 68 of the shift register 28. Corresponding connections are provided for the corresponding terminals of the parity checkers 75' and 75'' as seen in FIG. 2.

In accordance with conventional practice, each of the parity checkers 75, 75' and 75'' has an even input 92, 92' and 92'', respectively. The parity checkers 75, 75' and 75'' further have an even output 94, 94' and 94''. The even output of a parity checker reaches a binary one value if the number of binary one bits applied to the inputs 83 to 90 or 83' to 90' or 83'' to 92'' is even. The parity checkers 75 and 75'' also have an odd output 95 and 95'', respectively. The parity checker 75' also has an odd output which, however, is not shown since it is not utilized in the instant application.

The odd output of a parity checker rises to a value of a binary one if the number of binary one bits applied to the inputs 83 to 90 or 83'' to 90'' is odd.

Figure 3:
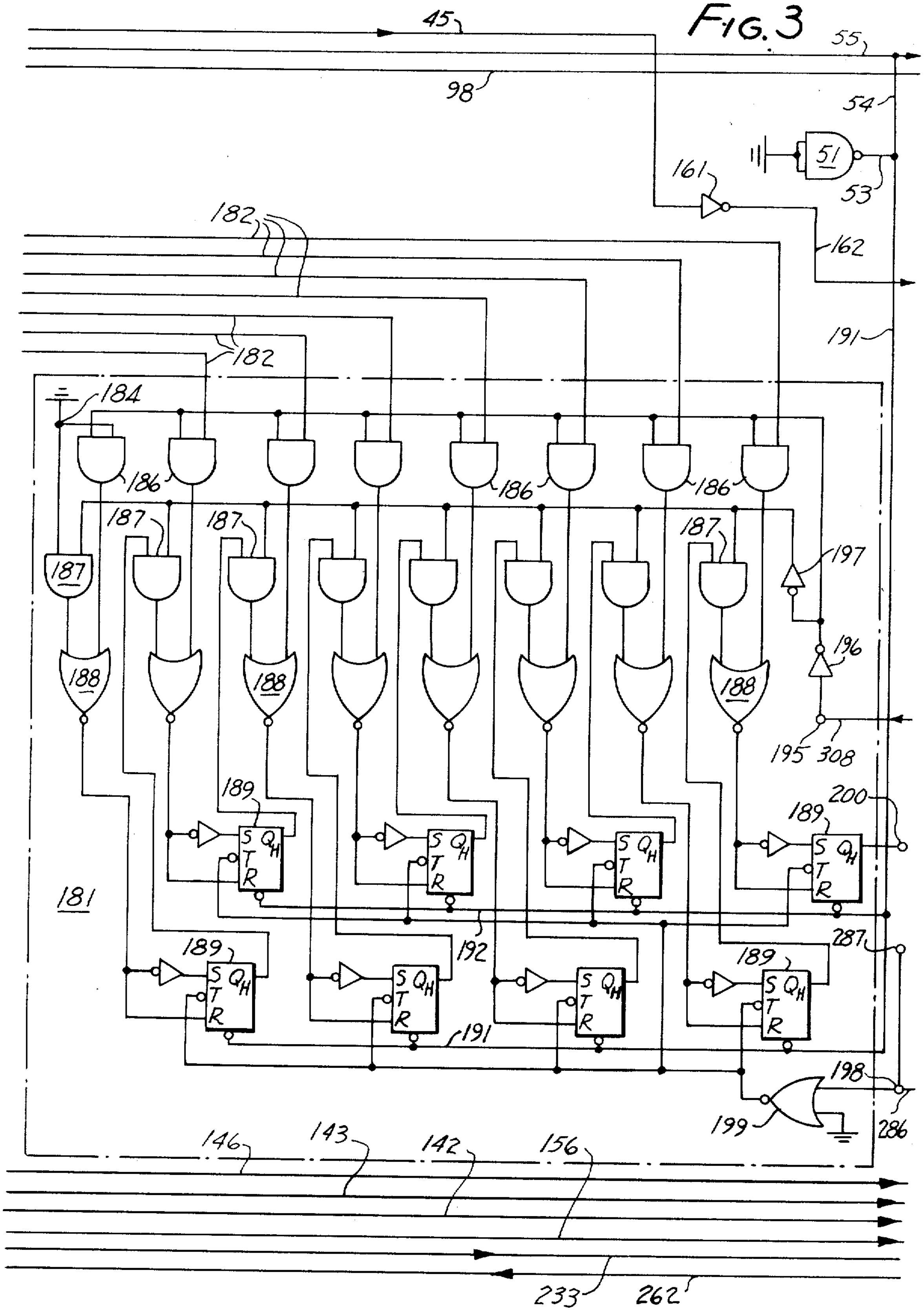
Figure 4:
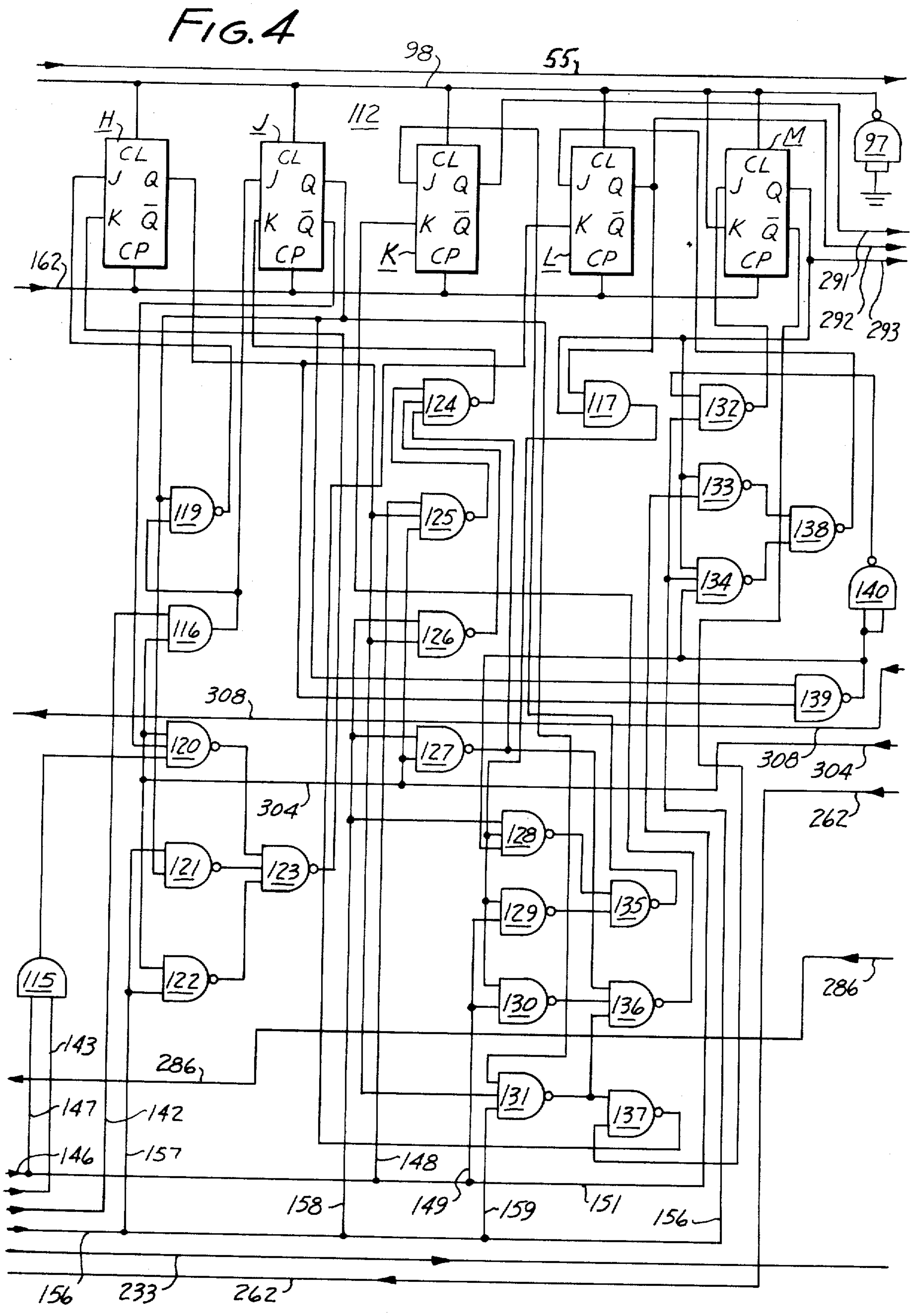

The even input 92'' is tied to a binary one potential which is supplied by a NOR element 97 by way of leads 98 and 99. The NAND element 97 is shown in FIG. 4 and the lead 98 extends over FIGS. 2, 3 and 4.

The odd output 95'' of the parity checker 75'' is connected by a lead 101 to the even input 92'' of the parity checker 75'. The even output 94' is connected by an inverter 102 and a lead 103 to the even input 92 of the parity checker 75. Accordingly, the even output 94 of the parity checker 75 is high (i.e. is a binary one) when the number of binary one bits in each set of successive $(n+p)$ bits of the $m(n+p)$ bits shifted into the registers 28, 28' and 28'' is even. In a similar vein, the even output 94'' of the parity checker 72'' is high when the number of binary one bits of the $(n+p)$ bits in the register 28'' is even. Conversely, the odd output 95'' of the parity checker 75'' is high if the number of binary one bits of the $(n+p)$ bits in the shift register 28'' is odd.

Considering the nature of the first stream of binary words 10 with identically shaped word and parity bits, it is statistically possible that the number of binary one word and parity bits in three adjacent sets of $(n+p)$ or $(n+1)$ bits is odd, even when the three sets are not three words but when each set is constituted by fragments of adjacent words. This statistical probability can be diminished by increasing the above mentioned factor m and effecting the odd/even determination for all $m$ sets simultaneously. In terms of equipment and operational complexity, there are of course practical limits as to the magnitude of the factor $m$.

Figure 6:
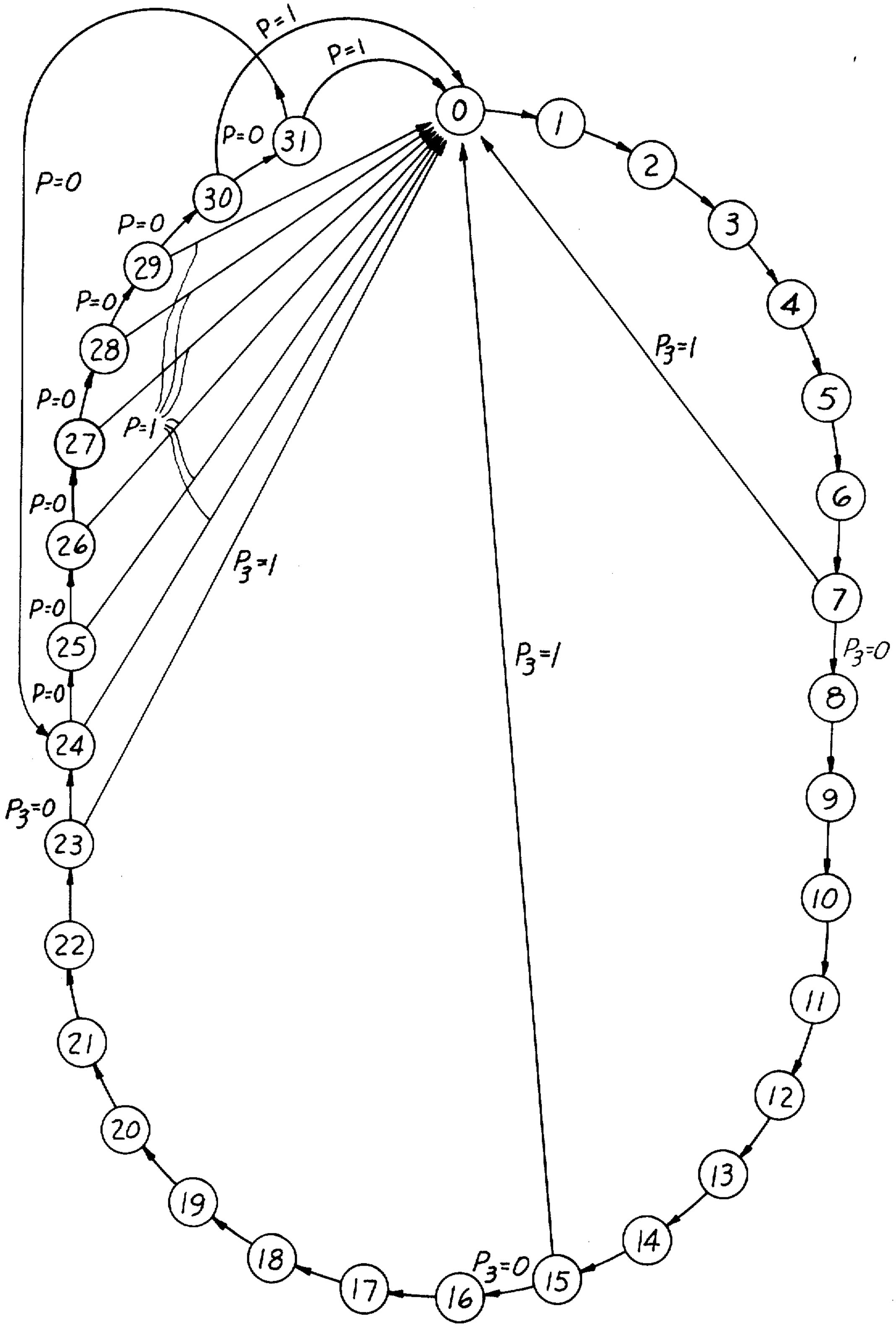
FIG. 6 is a diagrammatic chart illustrating the method of operation of the part of the apparatus shown in FIG. 4.

To overcome these limitations I have devised a system which will continuously effect and evaluate the odd/even determinations. A preferred embodiment of this system is shown in FIGS. 4 and 6.

The means for controlling and evaluating the odd/even determination include, according to the illustrated preferred embodiment of the invention, a binary counter 112 having $m(n+p)$ counting states. With respect to the counter 112 in the illustrated preferred embodiment the factor $m$ is 4, $n$ is 7 and $p$ is 1. Accordingly, there are 32 counting stages.

In order to more fully illustrate the operation of the counter 112 with associated equipment a table of various counting stages is presently set forth. In column 1 so-called "present" states are illustrated relative to the states shown in the subsequent columns. The first state zero together with the subsequent 31 states constitute the 32 states previously referred to.

In column 2 of the table states are illustrated which occur when the number of binary one word and parity bits is odd in each of the three sets of bits in the registers 28, 28' and 28''. In that case, the designation P=1 may be used to indicate that the number of binary one bits in each of the three sets of bits is odd. The designation $P_3$=1 is used to indicate that the number of binary one bits in the set of bits stored in the register 28'' is odd. Column 3 illustrates counting stages which occur when the number of binary one bits in the register 28'' is odd ($P_3$=1) while either or both of the shift registers 28 and 28' have an even number of binary one bits (P=0). It will be noted that the designation P=0 is employed to indicate that any one or more of the sets of bits in the registers 28. 28' and 28'' has an even number of binary one word or parity bits. Column 4 illustrates counting states which occur when at least the set of bits in the register 28'' has an even number of binary one bits.

TABLE

| Column 1 Present HJKLM | Column 2 P = 1, $P_3$ = 1 HJKLM | Column 3 P = 0, $P_3$ = 1 HJKLM | Column 4 P = 0, $P_3$ = 0 HJKLM |
|---|---|---|---|
| 00000 0 | 00001 1 | 00001 1 | 00001 1 |
| 00001 1 | 00010 2 | 00010 2 | 00010 2 |
| 00010 2 | 00011 3 | 00011 3 | 00011 3 |
| 00011 3 | 00100 4 | 00100 4 | 00100 4 |
| 00100 4 | 00101 5 | 00101 5 | 00101 5 |
| 00101 5 | 00110 6 | 00110 6 | 00110 6 |
| 00110 6 | 00111 7 | 00111 7 | 00111 7 |
| 00111 7 | 00000 0 | 00000 0 | 01000 8 |
| 01000 8 | 01001 9 | 01001 9 | 01001 9 |
| 01001 9 | 01010 10 | 01010 10 | 01010 10 |
| 01010 10 | 01011 11 | 01011 11 | 01011 11 |
| 01011 11 | 01100 12 | 01100 12 | 01100 12 |
| 01100 12 | 01101 13 | 01101 13 | 01101 13 |
| 01101 13 | 01110 14 | 01110 14 | 01110 14 |
| 01110 14 | 01111 15 | 01111 15 | 01111 15 |
| 01111 15 | 00000 0 | 00000 0 | 10000 16 |
| 10000 16 | 10001 17 | 10001 17 | 10001 17 |
| 10001 17 | 10010 18 | 10010 18 | 10010 18 |
| 10010 18 | 10011 19 | 10011 19 | 10011 19 |
| 10011 19 | 10100 20 | 10100 20 | 10100 20 |
| 10100 20 | 10101 21 | 10101 21 | 10101 21 |
| 10101 21 | 10110 22 | 10110 22 | 10110 22 |
| 10110 22 | 10111 23 | 10111 23 | 10111 23 |
| 10111 23 | 00000 0 | 00000 0 | 11000 24 |
| 11000 24 | 00000 0 | 11001 25 | 11001 25 |
| 11001 25 | 00000 0 | 11010 26 | 11010 26 |
| 11010 26 | 00000 0 | 11011 27 | 11011 27 |
| 11011 27 | 00000 0 | 11100 28 | 11100 28 |
| 11100 28 | 00000 0 | 11101 29 | 11101 29 |
| 11101 29 | 00000 0 | 11111 31 | 11111 31 |
| 11111 31 | 00000 0 | 11000 24 | 11000 24 |

In the table just set forth, the various states are numbered at the right-hand side of each column. To effect and control the various switching states, the apparatus shown in FIG. 4 includes in accordance with the illustrated preferred embodiment of the invention a number of AND elements 115 to 117 and a number of NAND elements 119 to 140, all connected as shown in FIG. 4.

In particular, a lead 142 connects the output 94'' of the parity checker 75'' to an input of the AND element 116 in FIG. 4. A lead 143 connects the output 95'' of the parity checker 75'' to an input of the AND element 115. A lead 146 shown in FIGS. 1, 2, 3 and 4 with branches 147, 148, 149 and 151 connects the output 94 of the parity checker 75 to the AND element 115, NAND element 125, NAND elements 129 and 130 and NAND element 133 in FIG. 4. The output 94 of the parity checker 75 is also connected by a lead 153 to an inverter 154 which, in turn, is connected by a lead 156 shown in FIGS. 1, 2, 3 and 4 with branches 157, 158 and 159 to NAND elements 121, 122, 126, 127, 128, 131, 132 and 134.

The clear or CL inputs of the J-K flip-flop elements H,J,K,L and M are tied by the lead 98 to the binary one output of the NAND element 97. The inverse of the first series of clock pulses 17 received from the source 25 clocks the counter 112. To this end, the lead 45 extending over FIGS. 1, 2 and 3 is connected to an inverter 161 shown in FIG. 3. A lead 162 connects the output of the inverter 161 to the clock or CP inputs of the J-K flip-flop elements H, J, K, L and M.

The states shown in the above mentioned Table are also illustrated in FIG. 6. As seen in FIG. 6, odd/even determinations as to the word in the shift register 28'' ($P_3$=1 or $P_3$=0) is made after every set of $m(n+p)$ or $m(n+1)$ counting states. In the illustrated preferred embodiment, this places these determinations at counting states number 7, 15 and 23. Each time such a determination indicates that $P_3$=1 the counter 112 is set back to zero preparatory to the commencement of a new counting operation. On the other hand, if a determination shows that $P_3$=0 the counting operation continues into the next counting stages of the series $m(n+p)$.

At the counting step number 23 a determination is again made whether $P_3$=1 or $P_3$=0. If $P_3$=1, the counter 112 is reset to zero. If $P_3$=0, the counter 112 is advanced to step number 24. After that step a determination whether P=1 or P=0 is made with each step with respect to the output of the parity checker 75 shown in FIG. 1. It will be recalled that the output of the parity checker can only be odd if the number of binary one bits in each set of bits in the shift registers 28, 28' and 28'' is odd. It may thus be said that in the case of counting steps 24 to 31, the odd/even determination is made simultaneously on all sets of the $m(n+p)$ bits, wherein $m$ is 3, $n$ is 7 and $p$ is 1 in the illustrated preferred embodiment. Every determination that P=1 resets the counter 121 to the zero state. Every determination that P=0 advances the counter by one step until the step number 31 is reached. At that stage, a determination that P=0 recycles the counter to step number 24 as shown in FIG. 6.

Upon resetting of the counter 121 to the zero state in response to a determination that $P_3$=1 or P=1, a broadside transfer of binary bits is effected from the shift register 28'' shown in FIG. 2 to a parallel-in serial-out shift register 181 shown in FIG. 3. This broadside transfer proceeds by way of a series of leads 182 which extend from the terminals 62'' to 68'' of the shift register 28'' in FIG. 2 to inputs of the register 181 in FIG. 3. It will be noted that no lead proceeds from the terminal 61'' of the shift register 28'' to the shift register 181. It will also be noted that the first input 184 of the register 181 of FIG. 3 is grounded. This is an important feature of the preferred illustrated embodiment in that an omission of the parity bits is thereby effected. In other words, the parity bit which is stored in the shift register 28'' in the flip-flop element corresponding to the output terminal 61'' is not transferred to the shift register 181. That this non-transferred bit is indeed the parity bit follows from the fact that the parity bits in the data stream 10 illustrated in FIG. 7 are located at corresponding locations in the words 12, 13, 14 and 15 (e.g. at the end of each word in the illustrated example). The word or data bits, on the other hand, are located at corresponding different locations.

The shift register 181 shown in FIG. 3 has a number of AND elements 186 and a number of AND elements 187. The shift register 181 further includes a number of NOR elements 188 which have their inputs connected to the AND elements 186 and 187 and which drive set-reset flip-flop elements 189 as shown. Leads 191 and 192 connect the clear inputs of the flip-flop elements 189 to the binary one output of the NAND element 51.

A shift/load input 195 and inverters 196 and 197 are provided to switch the register 181 for broadside transfer of data from the register 28'' to the register 181 by way of the leads 182 upon the receipt of a load signal at the input 195.

The register 181 is clocked by way of a clock input 198 and a NOR element 199 by clock pulses from the second series of clock pulses 19 illustrated in FIG. 7. Since the parity bits are not transferred to the register 181 and since this register is clocked by the second series of clock pulses 19, there is provided at an output 200 of the register 181 a second continuous stream of binary words, as illustrated at 20 in FIG. 7, in which the binary words of the first stream 10 are expanded into the time periods of the removed parity bits. In other words, the stream of data bits of each word of the second stream 20 is expanded to occupy the time slots of the stream of data bits as well as the time slot of the now removed parity bit or bits of each corresponding word of the first stream 10 of binary words.

The shift register 181 may be of a conventional type, such as the parallel-in serial-out shift register Type SN74166 made by Texas Instruments Incorporated, and described and shown, for instance, in Texas Instruments catalog CC-401, Section 9, pages 134–141.

It will be noted at this juncture that the words in the second stream 20 are not necessarily in synchronism with the corresponding words in the first stream 10 in the manner shown in FIG. 7. Rather, the words in the second stream 20 may be delayed relative to the words in the first stream 10 due to normal delays occurring in practice in the operation of the illustrated equipment.

The generation of the second series of clock pulses 19 for operation of the second shift register 181 will now be described with the aid of FIGS. 2 and 5. In general, the second series of clock pulses is provided by generating with the aid of the first series of clock pulses a signal having a frequency equal to bn times the clock pulse rate of the first series, and by generating with the aid of that signal a series of clock pulses having a pulse rate equal to $1/[b(n+1)]$, wherein $b$ is a positive number. In the illustrated preferred embodiment, this positive number is equal to one. Accordingly, the second series of clock pulses 19 is in the illustrated preferred embodiment provided by generating with the aid of the first series of clock pulses 17 a signal having a frequency equal to seven times the clock pulse rate in the first series 17, and by generating with the aid of that signal a series of clock pulses 19 having a rate equal to one-eighth times the latter frequency.

Figure 5:
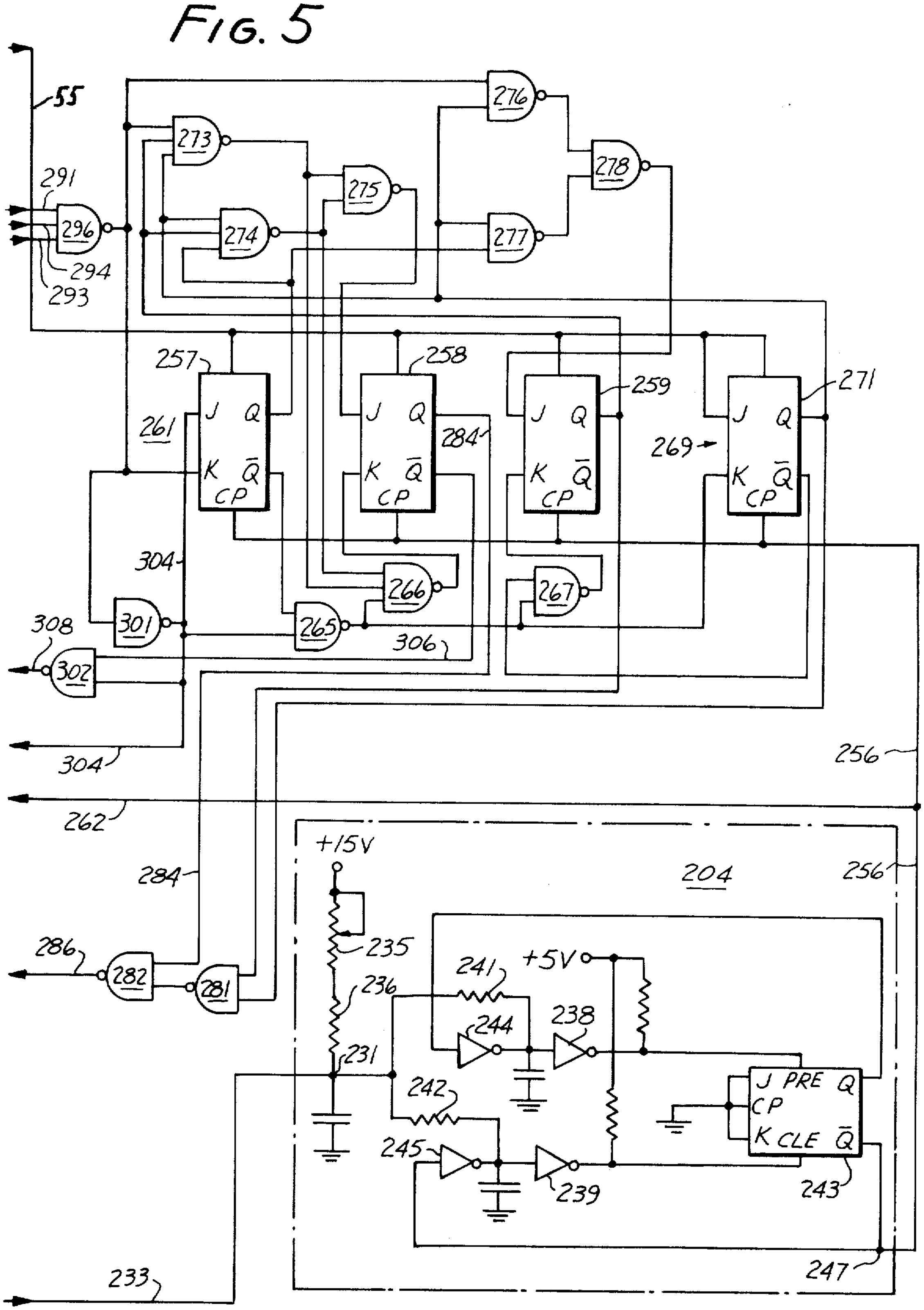

The latter frequency of seven times the clock pulse rate in the series 17 is in the illustrated preferred embodiment generated with the aid of a phase detector 202 and amplifier stage 203 shown in FIG. 2, and a voltage controlled oscillator 204 shown in FIG. 5. This system is based on the corresponding system disclosed in the above mentioned John Way patent application.

A lead 206 is connected to the lead 45 to apply pulses from the first series of clock pulses 17 to NAND elements 207 and 208 of the phase detector 202. A seven counter 209 has its Q and Q outputs connected by leads 210 and 211 to the NAND elements 207 and 208 of the phase detector 202.

The output of the NAND element 207 is applied to the inverting input of an operational amplifier 213 by way of an inverter 214 and a resistor 215. The output of the NAND element 208 is applied by way of a resistor 216 to the inverting input of the operational amplifier 213. A variable resistor 218 is connected by way of a resistor 219 to the inverting input of the amplifier 213 and provides for a zero adjustment of the phase-lock loop formed by way of the leads 210 and 211.

The signal thus applied to the inverting input of the amplifier 213 is representative of the frequency difference between the clock pulses received by way of the lead 206 and the feedback pulses received through the leads 210 and 211.

A voltage divider 221 applied to the non-inverting input of the operational amplifier 213 a voltage of, say, plus 2.3 volts. Similarly, the voltage applied to the inverting input of the amplifier 112 is also plus 2.3 volts when the phase detector 202 senses zero difference between the rate of the clock pulses received through the lead 206 and the frequency of the signal received by way of the leads 210 and 211.

Moreover, the voltage appearing at the output 223 of the operational amplifier 213 is also plus 2.3 volts when the voltages at the inverting and non-inverting inputs of the amplifier 213 are equal to plus 2.3 volts. The operational amplifier 213 may be of a conventional type, such as the well-known Type 715, made, for instance, by the Fairchild Semiconductor Division under the description $\mu$A715, and described and shown in the Fiarchild Linear Integrated Circuits catalog of November 1971 on pages 41–44. The latter voltages are, of course, only given by way of example as those skilled in the art will appreciate.

The operational amplifier 213 has a feedback circuit 224 including a lowpass filter. A capacitor 225 in the feedback circuit has a pair of oppositely poled diodes 226 and 227 connected in parallel thereto. The diodes 226 and 227 form an amplitude limiter which prevents spurious locking-in by the voltage controlled oscillator 204 by confining its operating range.

The output of the operational amplifier 213 in FIG. 2 is connected to the input 231 of the voltage controlled oscillator 204 in FIG. 5 by way of a resistor 232 and a lead 233. The lead 233 extends from FIG. 2 to FIG. 5 by way of FIGS. 3 and 4.

A variable voltage for adjustment of the frequency of the voltage controlled oscillator 204 is provided by a variable resistor 235 connected by way of a fixed resistor 236 to the voltage controlled oscillator input 231. The voltage controlled oscillator 204 includes inverters 238 and 239 connected to the input 231 by way of resistors 241 and 242. The output of the inverters 238 and 239 are, respectively, connected to the presetting input and the clearing input of a J-K flip-flop element 243. The flip-flop element 243 has its J, K and CP (clock pulse) inputs grounded. The Q and Q outputs of the flip-flops elements 243 are connected to the inverters 238 and 239 by way of inverters 244 and 245, respectively.

In general terms, the voltage controlled oscillator 204 generates at its output 247 a signal having a frequency equal to bn times the clock pulse rate of the first series of clock pulses 17. In the illustrated preferred embodiment, the voltage controlled oscillator 204 generates at its output 247 a signal having a frequency equal to seven times the rate of the clock pulses in the first series 17. To permit operation with different clock pulse rates, further J-K flip-flop elements (not shown) with associated selector switch (not shown) may be provided for a clock pulse rate division of 2, 4, 8, etc.

The output of the voltage controlled oscillator 204 is applied by way of a lead 256 as clock pulses to three J-K flip-flop elements 257, 258 and 259 of an eight counter 261. A lead 262 extending from FIG. 5 through FIGS. 4 and 3 to FIG. 2 applies the output of the voltage controlled oscillator 204 for a division by seven to the seven counter 209 which, in turn, applies the divided signal by way of leads 210 and 211 to the phase detector 202.

Since the voltage controlled oscillator 204 in effect multiplies the clock rate of the series 17 by 7, and since the seven counter 209 divides the multiplied frequency by seven, it follows that the frequency of the signal applied by way of the leads 210 and 211 to the phase detector 202 is normally equal to the pulse rate of the pulse series 17 derived from the source 25 in FIG. 1. The phase detector 202, amplifier stage 203, voltage controlled oscillator 204, seven counter 209, and leads 210 and 211 form a phase-lock loop which slaves the output frequency of the voltage controlled oscillator 204 to the input pulse rate of the phase detector 202.

To perform its function, the eight counter 261 includes NAND elements 265, 266 and 267 connected as shown in FIG. 5. A modifier 269 including a further J-K flip-flop element 271 is provided and connected to the eight counter 261 in order to synchronize the second clock pulse series 19 with the first clock pulse series 17 as far as the beginning of each binary word is concerned.

The eight counter 261 and modifier 271 further include NAND elements 273 to 278 connected as shown in FIG. 5. The eight counter 261 and modifier 269 moreover include NAND elements 281 and 282. The NAND element 281 has its input connected to the Q and Q outputs of the modifier flip-flop element 271. The NAND element 282 has one input connected to the output of the NAND element 281 and another input connected by way of a lead 284 to the Q output of the flip-flop element 258 of the counter 261. In consequence, the clock pulses in the second series 19 are in synchronism with the bits of the words in the second stream 20.

The resulting second clock pulse series 19 is applied by a lead 286, extending from FIG. 5 by way of FIG. 4 to FIG. 3, to the clock pulse input 198 of the shift register 181. A terminal 287 is connected to the terminal 198 and lead 286 to provide at the data output terminal 200 an output terminal for the second series of clock pulses 19.

Generation of the load signal for the register 181 will now be considered in greater detail.

The counter 112 in FIG. 4 times the generation of the load signal for the register 101 by way of three leads 291, 292 and 293 which, respectively, extend from the flip-flop elements K, L, and M in FIG. 4 to a NAND element 296 in FIG. 5. The output of the NAND element 296 is connected to the NAND elements 273 and 276, to the K-input of the flip-flop element 257 of the eight counter 261 and to an input of a NAND element 301. The output of the NAND element 301 is connected to the J-input of the flip-flop element 57, to an input of the NAND element 265, to an input of a NAND element 302, and, by way of a lead 304 to the AND element 116 and to the NAND element 120, 122, 125 and 127 in FIG. 4.

A lead 306 connects the Q output of the flip-flop element 258 of the eight counter 261 to the other input of the NAND element 302. The output of the NAND element 302 in FIG. 5 is connected by a lead 308 to the shift/load input 195 of the register 181 in FIG. 3. The lead 308 extends by way of FIG. 4 as shown.

In the operation of the illustrated equipment, the NAND element 302 shown in FIG. 5 operates by way of the lead 308 to apply a load signal to the input 195 of the register 181 whenever a loading of data from the shift register 28'' by way of the leads 182 into the shift register 181 is to be effected. As previously indicated, the data thus transferred to the shift register 181 are serially shifted out through the output 200 under the control of the second series of clock pulses 19 applied to the input terminal 198 of the shift register 181. In this manner, the data represented by the second stream of binary words 20 in FIG. 7 are realized.

It will thus be recognized that the illustrated equipment meets all the objectives of the subject invention defined initially and set forth throughout this disclosure.

Variations and modifications within the spirit and scope of the subject invention will suggest themselves from the subject disclosure to those skilled in the art.

I claim:

1. In a method of removing parity bits from a first continuous stream of binary words accompanied by a first series of clock pulses, the improvement comprising in combination the steps of:

identifying the parity bits in the first stream of binary words;

removing the identified parity bits;

providing a second continuous stream of binary words in which the binary words of said first stream are expanded into the time periods of the removed parity bits; and providing a second series of clock pulses adapted to said expanded binary words in the second stream.

2. A method as claimed in claim 1, wherein:

each binary word in said first stream is provided with n bits;

each binary word in said first stream is accompanied by $(n+p)$ clock pulses of said first series of clock pulses, wherein p is equal to the number of parity bits per binary word in said first stream;

said second series of clock pulses is provided with $n$ clock pulses for each $(n+p)$ clock pulses of said first series of clock pulses; and said second stream of binary words is provided by extending each binary word of said first stream over n clock pulses of said second series of clock pulses.

3. A method as claimed in claim 1, wherein:

each binary word in said first stream is provided with n word bits and with no more than one parity bit, the parity bits in the different binary words being situated at corresponding locations;

each binary word with parity bit in said first stream is accompanied by $(n+1)$ clock pulses of said first series of clock pulses;

said second series of clock pulses is provided with n clock pulses for each $(n+1)$ clock pulses of said first series of clock pulses; and said second stream of binary words is provided by extending each binary word of said first stream over n clock pulses of said second series of clock pulses.

4. A method as claimed in claim 3, wherein:

said second series of clock pulses is synchronized with said first series of clock pulses.

5. A method as claimed in claim 3, wherein:

said second series of clock pulses is provided by generating with the aid of said first series of clock pulses a signal having a frequency equal to bn times the clock pulse rate of said first series, and by generating with the aid of said signal a series of clock pulses having a pulse rate equal to $1/[b(n+1)]$, wherein b is a positive number.

6. A method as claimed in claim 1, wherein:

each binary word in said first stream is provided with n word bits and p parity bits;

said identification of parity bits includes the step of determining for $(n+p)$ bits from said first stream of binary words whether the number of binary one bits in said $(n+p)$ bits is even or odd; and said removal of identified parity bits includes the step of transferring only n bits of said $(n+p)$ bits in response to said determination.

7. A method as claimed in claim 6, wherein:

said identification of parity bits includes the further step of determining for $m(n+p)$ bits from said first stream of binary words whether the number of binary one bits in each set of successive $(n+p)$ bits of said $m(n+p)$ bits is even or odd, wherein $m$ is a positive integer greater than one; and said removal of identified parity bits includes the step of transferring in response to said determination only $n$ bits from each set of successive $(n+p)$ bits of said $m(n+p)$ bits.

8. A method as claimed in claim 1, wherein:

each binary word in said first stream is provided with n word bits and p parity bits;

said identification of parity bits includes the step of determining for $m(n+p)$ bits from said first stream of binary words whether the number of binary one bits in each set of successive $(n+p)$ bits of said $m(n+p)$ bits is even or odd, wherein $m$ is a positive integer greater than one; and said removal of identified parity bits includes the step of transferring in response to said determination only $n$ bits from each set of successive $(n+p)$ bits of said $m(n+p)$ bits.

9. A method as claimed in claim 1, wherein:

each binary word in said first stream is provided with n word bits and no more than one parity bit, the n word bits in different binary words being situated at corresponding first locations and the parity bits in different binary words being situated at corresponding second locations, and the number of binary one word and parity bits being odd in essentially each word;

said identification of parity bits includes the step of determining for $(n+1)$ bits from said first stream of binary words whether the number of binary one bits in said $(n+1)$ bits is even or odd; and said removal of identified parity bits includes the step of transferring only binary bits from said first locations in response to a determination that the number of binary one bits in said $(n+1)$ bits is odd.

10. A method as claimed in claim 9, wherein:
said identification of parity bits includes the further step of determining for $m(n+1)$ bits from said first stream of binary words whether the number of binary one bits in each set of successive $(n+1)$ bits of said $m(n+1)$ bits is even or odd, wherein $m$ is a positive integer greater than one; and
said removal of identified parity bits includes the step of transferring only binary bits from said first locations of each set of successive $(n+1)$ bits of said $m(n+1)$ bits in response to a determination that the number of binary one bits in each set of successive $(n+1)$ bits of said $m(n+1)$ bits is odd.

11. A method as claimed in claim 1, wherein:
each binary word in said first stream is provided with n word bits and no more than one parity bit, the n word bits in different binary words being situated at corresponding first locations and the parity bits in different binary words being situated at corresponding second locations, and the number of binary one word and parity bits being odd in essentially each word;
said identification of parity bits includes the step of determining for $m(n+1)$ bits from said first stream of binary words whether the number of binary one bits in each set of successive $(n+1)$ bits of said $m(n+1)$ bits is even or odd, wherein $m$ is a positive integer greater than one; and
said removal of identified parity bits includes the step of transferring only binary bits from said first locations of each set of successive $(n+1)$ bits of said $m(n+1)$ bits in response to a determination that the number of binary one bits in each set of successive $(n+1)$ bits of said $m(n+1)$ bits is odd.

12. In a method of identifying parity bits in a continuous stream of binary words having $n$ word bits and p parity bits, the parity bits in different binary words being situated at corresponding locations, and the number of binary one word and parity bits being odd in essentially each word, the improvement comprising in combination the steps of:
determining for $m(n+p)$ bits from said stream of binary words whether the number of binary one bits in each set of successive $(n+p)$ bits of said $m(n+p)$ bits is even or odd, whether m is a positive integer greater than one; and
identifying the parity bits in said $m(n+p)$ bits on the basis of said corresponding locations in response to a determination that the number of binary one bits in each set of successive $(n+p)$ bits of said $m(n+p)$ bits is odd.

13. A method as claimed in claim 12, wherein:
said determination is effected for $m(n+p)$ bits at a time.

14. A method as claimed in claim 12, wherein:
$p = 1$;
said determination includes the step of determining for $m(n+1)$ bits from said stream of binary words whether the number of binary one bits in each set of successive $(n+1)$ bits of said $m(n+1)$ bits is even or odd; and
said identification of parity bits includes the step of identifying the parity bits in said $m(n+1)$ bits on the basis of said corresponding locations in response to a determination that the number of binary one bits in each set of successive $(n+1)$ bits of said $m(n+1)$ bits is odd.

15. A method as claimed in claim 14, wherein:
said determination is effected for $m(n+1)$ bits at a time.

16. In apparatus for removing parity bits from a first continuous stream of binary words accompanied by a first series of clock pulses, the improvement comprising in combination:
first means for identifying parity bits in the first stream of binary words;
second means connected to the first means for removing the identified parity bits;
third means for providing a second continuous stream of binary words, said third means including fourth means for expanding for said second stream the binary words of said first stream into the time periods of the removed parity bits; and
fifth means for providing a second series of clock pulses adapted to said expanded binary words in said second stream.

17. An apparatus as claimed in claim 16, wherein:
said third means include a parallel-in serial-out shift register and means for clocking said shift register with said second series of clock pulses.

18. An apparatus as claimed in claim 16, for removing parity bits from a first continuous stream of binary words in which each word has n bits and is accompanied by $(n+p)$ clock pulses of said first series of clock pulses, wherein p is equal to the number of parity bits per binary word in said first stream, characterized in that:
said fifth means include means for providing said second series of clock pulses with n clock pulses for each $(n+p)$ clock pulses of said first series of clock pulses; and
said fourth means include means for extending each binary word of said first stream over n clock pulses of said second series of clock pulses.

19. An apparatus as claimed in claim 16, for removing parity bits from a first continuous stream of binary words in which each word has n word bits and no more than one parity bit, the parity bits in the different binary words being situated at corresponding locations, and the first series of clock pulses having $(n+1)$ clock pulses for each binary word with parity bit, characterized in that:
said fifth means include means for providing said second series of clock pulses with $n$ clock pulses for each $(n+1)$ clock pulses of said first series of clock pulses; and
said fourth means include means for extending each binary word of said first stream over $n$ clock pulses of said second series of clock pulses.

20. An apparatus as claimed in claim 19, wherein:
said fifth means include means for synchronizing said second series of clock pulses with said first series of clock pulses.

21. An apparatus as claimed in claim 19, wherein:
said fifth means include sixth means for generating with the aid of said first series of clock pulses a signal having a frequency equal to bn times the clock pulse rate of said first series, and seventh means for generating with the aid of said signal a series of clock pulses having a pulse rate equal to $l/[b(n+1)]$, wherein $b$ is a positive number.

22. An apparatus as claimed in claim 16, for removing parity bits from a first continuous stream of binary words in which each binary word has $n$ word bits and $p$ parity bits, characterized in that:

said first means include means for determining for $m(n+p)$ bits from the first stream of binary words whether the number of binary one bits in each set of successive $(n+p)$ bits of said $m(n+p)$ bits is even or odd, wherein $m$ is a positive integer greater than one; and said second means include means for transferring in response to said determination only n bits from each set of successive $(n+p)$ bits of said $m(n+p)$ bits.

23. An apparatus as claimed in claim 22, wherein: said first means include means for effecting said determination successively for at least some sets of successive $(n+p)$ bits of said $m(n+p)$ bits.

24. An apparatus as claimed in claim 22, wherein: said first means include means for effecting said determination simultaneously for at least some sets of successive $(n+p)$ bits of said $m(n+p)$ bits.

25. An apparatus as claimed in claim 22, wherein: said first means include counting means having $m(n+p)$ counting states.

26. An apparatus as claimed in claim 16, for removing parity bits from a first continuous stream of binary words in which each binary word has $n$ word bits and no more than one parity bit, the n word bits in different binary words being situated at corresponding first locations and the parity bits in different binary words being situated at corresponding second locations, and the number of binary one word and parity bits being odd in essentially each word, characterized in that:

said first means include means for determining for $m(n+1)$ bits from said first stream of binary words whether the number of binary one bits in each set of successive $(n+1)$ bits of said $m(n+1)$ bits is even or odd, wherein $m$ is a positive integer greater than one; and said second means include means for transferring only binary bits from said first locations of each set of successive $(n+1)$ bits of said $m(n+1)$ bits in response to a determination that the number of binary "one" bits in each set of successive $(n+1)$ bits of said $m(n+1)$ bits is odd.

27. In an apparatus for identifying parity bits in a continuous stream of binary words having n word bits and p parity bits, the parity bits in different binary words being situated at corresponding locations, and the number of binary one word and parity bits being odd in essentially each word, the improvement comprising in combination:

means for determining for $m(n+p)$ bits from said stream of binary words whether the number of binary one bits in each set of successive $(n+p)$ bits of said $m(n+p)$ bits is even or odd, wherein m is a positive integer greater than one; and means connected to said determining means for identifying the parity bits in said $m(n+p)$ bits on the basis of said corresponding locations in response to a determination that the number of binary one bits in each set of successive $(n+p)$ bits of said $m(n+p)$ bits is odd.

28. An apparatus as claimed in claim 27, wherein: said determining means include means for effecting said determination successively for at least some sets of successive $(n+p)$ bits of said $m(n+p)$ bits.

29. An apparatus as claimed in claim 27, wherein: said determining means include means for effecting said determination simultaneously for at least some sets of successive $(n+p)$ bits of said $m(n+p)$ bits.

30. An apparatus as claimed in claim 27, for identifying parity bits in a continuous stream of binary words having n word bits and no more than one parity bit, characterized in that:

said determining means include means for determining for $m(n+1)$ bits from the first stream of binary words whether the number of binary one bits in each set of successive $(n+1)$ bits of said $m(n+1)$ bits is even or odd; and said identifying means include means for identifying the parity bits in said $m(n+1)$ bits on the basis of said corresponding locations in response to a determination that the number of binary one bits in each set of successive $(n+1)$ bits of said $m(n+1)$ bits is odd.

31. An apparatus as claimed in claim 27, wherein: said determining means include counting means having $m(n+p)$ counting stages.

* * * * *